(12) United States Patent
Kajihara et al.

(10) Patent No.: US 7,758,845 B2
(45) Date of Patent: *Jul. 20, 2010

(54) METHOD FOR PRODUCING AN ALPHA ALUMINA PARTICLE

(75) Inventors: Kazuhisa Kajihara, Niihama (JP); Yoshiaki Takeuchi, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/080,932

(22) Filed: Mar. 15, 2005

(65) Prior Publication Data

US 2005/0204513 A1 Sep. 22, 2005

(30) Foreign Application Priority Data

Mar. 17, 2004 (JP) .............................. 2004-075813
Apr. 1, 2004 (JP) .............................. 2004-108759

(51) Int. Cl.
*C01F 7/02* (2006.01)

(52) U.S. Cl. .................................................. 423/625

(58) Field of Classification Search ................ 423/625
See application file for complete search history.

(56) References Cited

U.S. PATENT DOCUMENTS

| | | | |
|---|---|---|---|
| 4,657,754 A | 4/1987 | Bauer et al. | |
| 5,462,903 A | 10/1995 | Rousset et al. | |
| 5,935,550 A * | 8/1999 | Mohri et al. | 423/625 |
| 6,106,800 A * | 8/2000 | Mohri et al. | 423/625 |
| 6,841,497 B1 | 1/2005 | Krell et al. | |
| 2002/0187097 A1 | 12/2002 | Uchida et al. | |
| 2003/0098529 A1 * | 5/2003 | Drumm et al. | 264/624 |

| | | |
|---|---|---|
| 2003/0185746 A1 | 10/2003 | Kajihara et al. |

FOREIGN PATENT DOCUMENTS

| | | |
|---|---|---|
| CA | 970133 A | 7/1975 |
| CN | 1386705 A | 12/2002 |
| EP | 1262457 * | 12/2002 |
| WO | 00/69790 A2 | 11/2000 |
| WO | WO 00/69790 A2 | 11/2000 |

OTHER PUBLICATIONS

French Office Action and Search Report dated Oct. 14, 2005.
Sato T., "Aluminum Hydroxides and Aluminas", *Mineralogy Association Magazine*, vol. 19, No. 1, pp. 21-41, (1989).
Krell A. et al., "Nanocorundum-Advanced Synthesis and Processing", *NanoStructured Materials*, vol. 11, No. 8, pp. 1141-1153, (1999).
Rajendran S. et al., "Fabrication of a Fine Grained Alumina Ceramic", *Key Engineering Materials*, vols. 53-55, pp. 462-468, (1991).
Felde B. et al., "Synthesis of Ultrafine Alumina Powder by Sol-Gel Techniques", *9th Cimtec World Ceramics Congress, Ceramics: Getting into the 2000's-Part B.P. Vincenzini (Editor)*, pp. 49-56 (1999).
Ye Y. et al., "Prepartion of Ultrafine-$\alpha$-$Al_2O_3$ Powder by Thermal Decomposition of AACH at Low Temperature", *The Chinese Journal of Process Engineering*, vol. 2, No. 4, pp. 325-329, (2002).

* cited by examiner

*Primary Examiner*—Steven Bos
(74) *Attorney, Agent, or Firm*—Panitch Schwarze Belisario & Nadel LLP

(57) ABSTRACT

The present invention provides a method for producing an $\alpha$-alumina particle. The method for producing an $\alpha$-alumina particle comprises steps of:

(1) placing a powdery mixture containing an aluminum salt and a seed crystal under a circumstance at not less than pyrolysis temperature of the aluminum salt, and (2) calcining the resultant.

6 Claims, No Drawings

METHOD FOR PRODUCING AN ALPHA ALUMINA PARTICLE

BACKGROUND OF THE INVENTION

1. Field of the Invention

The present invention relates to a method for producing an α-alumina particle having a high α-ratio and small average primary particle diameter.

2. Description of Related Art

An α-alumina particle is one of aluminum oxides, and is widely used as a raw material to produce sintered bodies such as cutting tools or bioceramics.

An α-alumina particle is required to have a high α-ratio and average primary particle diameter in view of lowering a sintering temperature to obtain a sintered body from the α-alumina particle.

As the method for producing an α-alumina particle, there are known a method comprising a step of calcining an α-alumina precursor containing a seed crystal. (for example, JP-A No. 62-128918).

However, according to a conventional method, an α-alumina particle having a high α-ratio and small average primary particle diameter is not easily produced.

SUMMARY OF THE INVENTION

The present inventors have investigated methods for producing an α-alumina particle having a high α-ratio and small average primary particle diameter, and resultantly completed the present invention.

That is, the present invention provides a method for producing an α-alumina comprising steps of:
(1) placing a powdery mixture containing an aluminum salt and a seed crystal under a circumstance at not less than pyrolysis temperature of the aluminum salt, and
(2) calcining the resultant.

DETAILED DESCRIPTION OF THE PREFERRED EMBODIMENTS

The present invention provides a method for producing an α-alumina comprising a step(1) of placing the powdery mixture containing an aluminum salt and a seed crystal under circumstance at not less than pyrolysis temperature of the aluminum salt.

The aluminum salt used in the step(1) is an inorganic salt or an organic salt. Examples of the inorganic salts include aluminum nitrate, ammonium aluminum nitrate, aluminum sulfate, ammonium aluminum sulfate, aluminum carbonate, ammonium aluminum carbonate, aluminum chloride and ammonium alum. Examples of the organic salts include aluminum oxalate, aluminum acetate, aluminum stearate, aluminum lactate and aluminum laurate.

The seed crystal used in the step(1) is, for example, a particle made of α-alumina, diaspore, iron oxide, chromium oxide or titanium oxide. The seed crystal may be used independently or two or more of them may be used in combination. The seed crystal is usually in form of powder, and has a particle diameter of about 0.01 μm or more and about 0.5 μm or less. The seed crystal has a BET specific surface area of usually about 12 $m^2/g$ or more, preferably about 15 $m^2/g$ or more, and usually about 150 $m^2/g$ or less, preferably about 50 $m^2/g$ or less. The amount of the seed crystal is usually about 1% by weight or more, preferably about 2% by weight or more, more preferably about 5% by weight or more, and usually about 50% by weight or less, preferably about 40% by weight or less, further preferably about 30% by weight or less, based on the mixture containing the aluminum salt and the seed crystal in terms of metal oxide. In case a metal contained in the seed crystal is aluminum, iron, chromium or titanium, the metal oxide represents $Al_2O_3$, $Fe_2O_3$, $Cr_2O_3$, $TiO_2$, respectively.

The powdery mixture containing the aluminum salt and the seed crystal described above has usually water content of 50% by weight or less, which is sum of adsorbed water thereon and bound water thereto.

The powdery mixture may be prepared, for example, by a method of mixing the aluminum salt with a solvent to obtain a liquid, mixing the seed crystal or a slurry containing the seed crystal with the liquid, and then removing the solvent from the resultant. The mixing may be conducted by using an apparatus such as vertical granulator, Henschel mixer and the like.

In the step(1), the above-described mixture is placed under a circumstance at not less than pyrolysis temperature of the aluminum salt. For example, since the pyrolysis temperature of aluminum nitrate is about 150° C., the lower temperature of the circumstance is usually about 300° C. preferably about 500° C. On the other hand, the upper temperature may be less than the temperature at which the alumina salt completely transforms to an α-alumina, for example, lower than about 900° C., preferably about 800° C. or lower, further preferably about 700° C. or lower. The circumstance under which the mixture is placed may have an air or an inert gas such as $N_2$ and Ar.

A method for placing the mixture under circumstance at not less than pyrolysis temperature of the aluminum salt includes, for example, a method for introducing the mixture into the furnace, which is pre-heated at not less than pyrolysis temperature described above, by using a feeder, and a method for blowing hot gas at not less than pyrolysis temperature over the mixture. Examples of the furnace used in the former method include tubular electric furnace, box-type electric furnace, tunnel furnace, far-infrared furnace, micro-wave furnace, shuttle furnace, reflection furnace, rotary furnace, Roller Hearth furnace, pusher plate kiln, fluidized-bed furnace. The furnace may be batch-wise or continuous. Further, the furnace may be any of electric furnace or gas furnace.

In this operation, the aluminum salt contained in the mixture is pyrolyzed. The pyrolysis may be not necessarily completed. The pyrolysis of the aluminum salt is conducted under conditions of ΔM of preferably 0.8 or more, further preferably 0.9 or more, which is represented by the following equation (i):

$$\Delta M = \frac{(M_0 - M_1)}{(M_0 - M_2)} \quad \text{(i)}$$

wherein $M_0$ is the amount of aluminum salt before pyrolysis, $M_1$ is the total amount of aluminum salt and pyrolysate of the aluminum salt after 1 hour, preferably 30 minutes from the time of placing the aluminum salt, $M_2$ is the amount of residue after ignition at 1100° C. of the aluminum salt, ΔM is a weight decrease rate of aluminum salt in the pyrolysis.

Due to gas generation from the aluminum salt in the pyrolysis, the pyrolysis is preferably conducted with discharging the gas, or passing through an inert gas such as nitrogen and argon.

The present invention provides a method for producing an α-alumina comprising further step(2) of calcining the resultant obtained in the step(1).

The calcination may be conducted by using a furnace with the same type as furnace used in the pyrolysis. The calcination may be advantageously conducted under air or inert gas (for example, nitrogen and argon) from the standpoint that the circumstance sufficiently satisfies the condition of the controlled partial pressure of water vapor. Furthermore, the calcination may be conducted under any of normal pressure (1 atm), pressured atmosphere and reduced atmosphere. The calcination temperature is not less than the temperature at which the pyrolysate of the aluminum salt transforms to an α-alumina, and usually 600° C. or higher, preferably 700° C. or higher, and usually 1000° C. or lower, preferably 950° C. or lower. The calcination temperature is usually different from that of a circumstance under which the mixture is placed in step(1), preferably higher than the temperature thereof. Calcination time is usually about 10 minutes or more, preferably about 30 minutes or more, and usually about 24 hours or less, preferably about 10 hours or less.

In the calcination, the resultant obtained in step(1) may be placed in the furnace, continuously be calcined under conditions described above, or the resultant obtained in step(1) may be cooled at room temperature and then be calcined. In the latter method, the heating-rate ranging from room temperature to the temperature at which the pyrolysate of the aluminum salt transforms to an α-alumina is usually about 50° C./hour or more, preferably about 100° C./hour or more, and about 1000° C./hour or less, preferably about 500° C./hour or less. The α-alumina particle obtained in the calcination may be pulverized or classified.

The α-alumina particle obtained by the production method of the present invention has usually an α-ratio of usually about 95% or more, preferably about 97% or more, and average primary particle diameter of usually about 10 nm or more and usually 75 nm or less, preferably 70 nm or less, further preferably 65 nm or less. The α-alumina particle has a BET specific surface area of usually about 8 $m^2/g$ or more, preferably about 13 $m^2/g$ or more, further preferably about 15 $m^2/g$ or more and usually about 100 $m^2/g$ or less.

As above-described, the α-alumina particle obtained by the method of the present invention has a high α-ratio and small average primary particle diameter, therefore, the α-alumina particle is useful as a raw material for producing an α-alumina sintered body with high strength. The resulted α-alumina sintered body is suitable as a member for which high strength is required such as a cutting tool, bioceramics, low-resistance routing pattern ceramics (for example, alumina ceramics with copper pattern thereon) and bulletproof board. The α-alumina sintered body is, due to chemical stability such as excellent corrosion resistance, used as a part of an apparatus for producing a semiconductor such as a wafer handler; an electronic part such as an oxygen sensor; a translucent tube such as a sodium lamp and metal halide lamp; or a ceramic filter. A ceramic filter is used for removal of solid components contained in a exhaust gas, for filtration of aluminum melt, filtration of drinks such as beer, or selective permeation of a gas produced at petroleum processing or CO, $CO_2$, $N_2$, $O_2$, $H_2$ gas. The α-alumina powder may be used as a sintering agent for ceramics such as thermally conductive ceramics (for example, AlN), YAG and phosphors.

Further, the α-alumina particle may be used as an additive for toner or resin filler, for improving head cleaning property and friction resistance by addition thereof to an application layer of a magnetic medium of application type. Also, the α-alumina particle may be used as an additive for cosmetics or brake lining.

Furthermore, the α-alumina particle is used as a polishing material. For example, a slurry obtained by dispersing an α-alumina particle in a medium such as water is suitable for polishing of semiconductor CMP and polishing of a hard disk substrate. A polishing tape obtained by coating an α-alumina particle on the surface of a tape is suitable for precise polishing of a hard disk and magnetic head.

EXAMPLES

The present invention is described in more detail by following Examples, which should not be construed as a limitation upon the scope of the present invention.

The properties of an α-alumina and a seed crystal were evaluated by the following methods.

(1) α-ratio

It is calculated according to the following equation (ii) using the peak intensity $I_{25.6}$ at $2\theta=25.6°$ and the peak intensity $I_{67}$ at $2\theta=67°$ from a diffraction spectrum measured under conditions of radiation source: CuKα beam, 40 kV×20 mA, monochromator: graphite, by using a powder X-ray diffractometer:

$$\alpha\text{-ratio}=I_{25.6}/(I_{25.6}+I_{67})\times 100(\%) \quad \text{(ii)}$$

(2) Average Primary Particle Diameter

From a transmission electro micrograph of α-alumina particle, the maximum diameter along constant direction of each primary particle of any 20 or more particles was measured, and an average value of measured values was calculated.

(3) BET Specific Surface Area

It was measured by using specific surface area analyzer (trade name "FLOWSORB II 2300", manufactured by Shimadzu Corporation) with a nitrogen adsorption method.

Example 1

[Preparation of a Mixture Containing an Aluminum Salt and a Seed Crystal]

The aluminum hydroxide was obtained by hydrolyzing an aluminum isopropoxide, followed by pre-calcination to obtain a transition alumina in which the major crystal phase was θ phase and 3% by weight of α phase was contained, and then the transition alumina was ground by using a jet mill to obtain a powder having a bulk density of 0.21 $g/cm^3$. The powder was calcined under the following conditions of mode: continuous feeding and discharging, atmosphere: an air of −15° C. of dew point (partial pressure of water vapor: 165 Pa), average retention time: 3 hours, maximum temperature: 1170° C., to obtain an α-alumina.

Hundred (100) parts by weight of the obtained α-alumina and 1 part by weight of a propylene glycol as a pulverizing agent were charged into a vibration mill with alumina beads having a diameter of 15 mm, and pulverized for 12 hours to obtain a seed crystal having a BET specific surface area of 17.2 $m^3/g$, and average particle diameter of 0.1 μm.

In 80 parts by weight of aqueous aluminum nitrate solution of pH 4, 20 parts by weight of the seed crystal were dispersed, and the obtained mixture and alumina beads having a diameter of 2 mm were charged into a mill, and then agitated for 3 hours to obtain a seed crystal slurry.

375 g (1 mole) of aluminum nitrate nonahydrate ($Al(NO_3)_3 \cdot 9H_2O$)(manufactured by Kansai Catalyst Co., Ltd., reagent grade, appearance: powder) was dissolved in 778 g of water to obtain an aluminum nitrate solution. 110 g of seed crystal slurry described above (22 g in terms of $Al_2O_3$) was added to the aluminum nitrate solution and the obtained mixture was charged into a rotary evaporator, and dried at 60° C. under the reduced pressure to obtain a powdery mixture having 30% by weight of α-alumina as a seed crystal in terms of $Al_2O_3$.

[Pyrolysis]

200 g of the powdery mixture was introduced into a box-type furnace, which is pre-heated at 700° C., and maintained for 1 hour in the furnace and then discharged to obtain a pyrolysate. In this pyrolysis, $\Delta M$ $[=(M_0-M_1)/(M_0-M_2)]$ was 0.988.

The pyrolysate was calcined under the following conditions to obtain an α-alumina particle.
calcination temperature: 820° C.,
heating-rate ranging from room temperature to the calcination temperature: 300° C./hour,
retention time: 3 hours.

The properties of the α-alumina particle are shown in Table 1.

Example 2

The same operation as in Example 1 was conducted excepting that the calcination temperature was changed to 860° C. to obtain an α-alumina particle. The properties of the α-alumina particle are shown in Table 1.

Example 3

200 g of the mixed powder obtained in the same operation as [Preparation of a mixture containing an aluminum salt and a seed crystal] of Example 1 was introduced into a box-type furnace, which is pre-heated at 200° C., and maintained for 2 hours in the furnace and then discharged to obtained a pyrolysate. In this pyrolysis, $\Delta M$ $[=(M_0-M_1)/(M_0-M_2)]$ was 0.733.

The pyrolysate was calcined at 860° C. for 3 hours to obtain an α-alumina particle. The properties of the α-alumina particle are shown in Table 1.

Comparative Example 1

200 g of the mixed powder obtained in the same operation as [Preparation of a mixture containing an aluminum salt and a seed crystal] of Example 1 was placed in a box-type furnace and was heated at rate of 200° C./h from room temperature to 820° C. and maintained at 820° for 2 hours. The properties of the obtained α-alumina particle are shown in Table 1.

TABLE 1

|  | α-ratio % | Average primary particle diameter nm | BET specific surface area $m^2/g$ |
| --- | --- | --- | --- |
| Example 1 | 98 | 60 | 16.8 |
| Example 2 | 98 | 60 | 13.6 |
| Example 3 | 96 | 80 | 22.7 |
| Comparative Example 1 | 92 | 60 | 56.1 |

What is claimed is:

1. A method for producing an α-alumina particle comprising:
    (1) a pyrolysis step wherein a powdery mixture containing an aluminum salt and a seed crystal is placed under a circumstance at not less than a pyrolysis temperature of the aluminum salt and less than a temperature at which the aluminum salt completely transforms to α-alumina such that the aluminum salt is pyrolyzed to provide a pyrolysate, the pyrolysis step occurring at 700 to 900° C.; and
    (2) a calcining step wherein the pyrolysate of step (1) is calcined, the calcining step occurring at a temperature higher than the pyrolysis step.

2. The method for producing an α-alumina particle according to claim 1, wherein the aluminum salt is an inorganic salt.

3. The method for producing an α-alumina particle according to claim 1, wherein the seed crystal comprises at least one selected from the group consisting of α-alumina, diaspore, iron oxide, chromium oxide and titanium oxide.

4. The method for producing an α-alumina particle according to claim 1, wherein the seed crystal has a BET specific surface area of 12 $m^2/g$ or more.

5. The method for producing an α-alumina particle according to claim 1, wherein the amount of the seed crystal is 1% by weight or more based on a total amount of the aluminum salt and the seed crystal in terms of metal oxide.

6. The method for producing an α-alumina particle according to claim 1, wherein the pyrolysis step is carried out by introducing the powdery mixture into a furnace that has been preheated to not less than the pyrolysis temperature or blowing hot gas at not less than the pyrolysis temperature over the mixture.

* * * * *